United States Patent
Hall et al.

(10) Patent No.: US 9,998,489 B2
(45) Date of Patent: Jun. 12, 2018

(54) METHOD AND SYSTEM FOR TAMPER-PROOFING A DUAL MODULATION NETWORK

(71) Applicants: David R. Hall, Provo, UT (US); Mark Hall, Springville, UT (US); Craig Boswell, Draper, UT (US); Jedediah Knight, Provo, UT (US)

(72) Inventors: David R. Hall, Provo, UT (US); Mark Hall, Springville, UT (US); Craig Boswell, Draper, UT (US); Jedediah Knight, Provo, UT (US)

( * ) Notice: Subject to any disclaimer, the term of this patent is extended or adjusted under 35 U.S.C. 154(b) by 195 days.

(21) Appl. No.: 15/151,872

(22) Filed: May 11, 2016

(65) Prior Publication Data

US 2017/0331846 A1 Nov. 16, 2017

(51) Int. Cl.
*H04L 29/06* (2006.01)
*G06F 21/86* (2013.01)
*H04L 29/08* (2006.01)
*G07C 9/00* (2006.01)
*H04B 1/7136* (2011.01)

(52) U.S. Cl.
CPC .......... *H04L 63/1433* (2013.01); *G06F 21/86* (2013.01); *G07C 9/00126* (2013.01); *H04B 1/7136* (2013.01); *H04L 63/0428* (2013.01); *H04L 67/12* (2013.01); *H04B 2201/71323* (2013.01)

(58) Field of Classification Search
CPC . H04L 63/1433; H04L 63/0428; H04L 67/12; H04B 1/7136; H04B 2201/71323; G07C 9/00126; G06F 21/86
See application file for complete search history.

(56) References Cited

U.S. PATENT DOCUMENTS

| | | | | |
|---|---|---|---|---|
| 2006/0029018 A1* | 2/2006 | Mizukami | ............ | H04B 1/7156 370/328 |
| 2008/0159355 A1* | 7/2008 | Rengert | ................. | H04B 1/715 375/133 |
| 2011/0111700 A1* | 5/2011 | Hackett | .................. | A01G 25/16 455/41.2 |

* cited by examiner

Primary Examiner — Meng Li

(57) ABSTRACT

A system and method for a tamper-resistant network is disclosed. The system includes a primary network hub (PNH) having a PNH transceiver and a PNH microcontroller. The PNH microcontroller has long range spread spectrum frequency hopping (SSFH) firmware, a plurality of frequency hopping sequences, and PNH tamper firmware. The system also includes a peripheral device (PD) having a PD transceiver, a PD tamper circuit, and a PD microcontroller. The PD microcontroller includes the long range SSFH firmware, the plurality of frequency hopping sequences, and PD tamper firmware. The PD communicates to the PNH that it is compromised, and the PNH deactivates the PD and an associated frequency hopping signal.

6 Claims, 12 Drawing Sheets

METHOD AND SYSTEM FOR TAMPER-PROOFING A DUAL MODULATION NETWORK

TECHNICAL FIELD

This invention relates generally to the field of dual modulation networks, and more specifically to tamper-proof and/or tamper-resistant dual modulation networks.

BACKGROUND

Device-device communication and coordination, coined the "internet of things" (IoT), is primarily accomplished through direct communication between devices via wireless protocols such as Bluetooth, ZigBee, Wifi and 3G and 4G systems, among others. These protocols have the benefit of having high throughput, but have either a short range or require significant power to operate over longer ranges. This results in short battery lives for wireless devices communicating over these types of networks. The Z-Wave protocol, which operates at a lower frequency, improves on these limitations, but still has a limited range of up to 200 meters. The range of a Z-Wave network can be extended via a mesh network, but is currently limited to forwarding data across four hubs. However, a mesh network can be cost-intensive because of the significant amount of hardware and power required. Additionally, many IoT applications require devices to communicate over long distances over which it is impractical or impossible to add range-extending nodes. Thus, for many IoT applications, the significant cost and limited range severely limits functionality.

IoT networks also suffer from security threats. Because most IoT device communication protocols are firmware-based, a network attacker could obtain network information by physically hacking into the device. In some applications, data is software-encrypted for additional security. However, this increases the data packet size and increases power consumption by requiring decryption. Thus, current solutions are impractical for many applications.

SUMMARY OF THE INVENTION

A tamper-resistant, dual modulation network and methods for communicating over such a network are described below which overcome many of the limitations of the current state of the art described above. Generally, the network includes one or more hubs and one or more peripheral devices. The hubs each have long range transceivers and microcontrollers. The hub microcontrollers are programmed with firmware that instructs the long range transceivers to use either a long range spread spectrum frequency hopping (SSFH) signal for communicating information, or a narrowband frequency shift keying (FSK) signal. The hub microcontrollers also include firmware that instructs the long range transceivers to listen for the long range SS or narrowband FSK signals. The peripheral devices each have a tamper circuit and tamper firmware, in addition to a transceiver and a microcontroller having communication firmware for communicating with the hubs.

The features just described offer several benefits over those systems described in the background above. First, the SSFH signals are physically encrypted because the frequency sequences used are only known to the transmitter and receiver. Thus, individuals and/or devices listening to the signal would not be able to decipher a multiplexed SSFH signal. Second, the peripheral devices, and in some cases, the hub, include tamper circuits and firmware that shut down and/or change the system when an intrusion is detected. In addition to these benefits, those of skill in the art will recognize other benefits not described herein, but inherent to the system.

In one embodiment, a system is described which includes a primary network hub (PNH). The PNH includes a PNH transceiver and a PNH microcontroller. The PNH microcontroller includes long range SSFH firmware that has instructions that instruct the PNH transceiver to communicate information via a long range SSFH signal. The PNH microcontroller also includes a plurality of frequency hopping sequences and firmware with instructions for selecting one of the plurality of frequency hopping sequences. The PNH microcontroller also includes PNH tamper firmware. The system further includes a peripheral device (PD) having a PD transceiver, a PD tamper circuit, and a PD microcontroller. The PD microcontroller includes the long range SSFH firmware and the plurality of frequency hopping sequences. The PD microcontroller also includes PD tamper firmware having instructions that instruct the PD to notify the PNH that one or more of the plurality of frequency hopping sequences is compromised. The PNH tamper firmware includes instructions that deactivate the compromised frequency hopping sequences.

In some embodiments, the system also includes a secondary network hub (SNH). The SNH has a SNH transceiver, a SNH tamper circuit, and a SNH microcontroller. The SNH microcontroller includes the long range SSFH firmware and the plurality of frequency hopping sequences. Additionally, the SNH microcontroller has SNH tamper firmware with instructions that instruct the SNH to notify the PNH that one or more of the plurality of frequency hopping sequences has been compromised. The SNH tamper firmware also includes instructions that instruct the SNH to notify one or more SNH-networked devices that one or more of the plurality of frequency hopping sequences is compromised.

A method is also disclosed herein. The method includes receiving a notification at a primary network hub (PNH) that one of a plurality of frequency hopping sequences is compromised. The notification is transmitted by a peripheral device (PD) having a tamper circuit, and the tamper circuit notifies the PD that the compromised frequency hopping sequence is compromised. The method also includes deactivating the compromised frequency hopping sequence. A PNH microcontroller includes deactivation firmware that removes the compromised frequency hopping sequence from the plurality of frequency hopping sequences. The method additionally includes deactivating the PD, selecting a secure frequency hopping sequence from the plurality of frequency hopping sequences, and send the secure frequency hopping sequence to one or more PNH-networked devices. The PNH-networked devices each include a PNH networked-device microcontroller having long range spread spectrum frequency hopping (SSFH) firmware. The method also includes updating the long range SSFH firmware with the secure frequency hopping sequence.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

Figure 1:
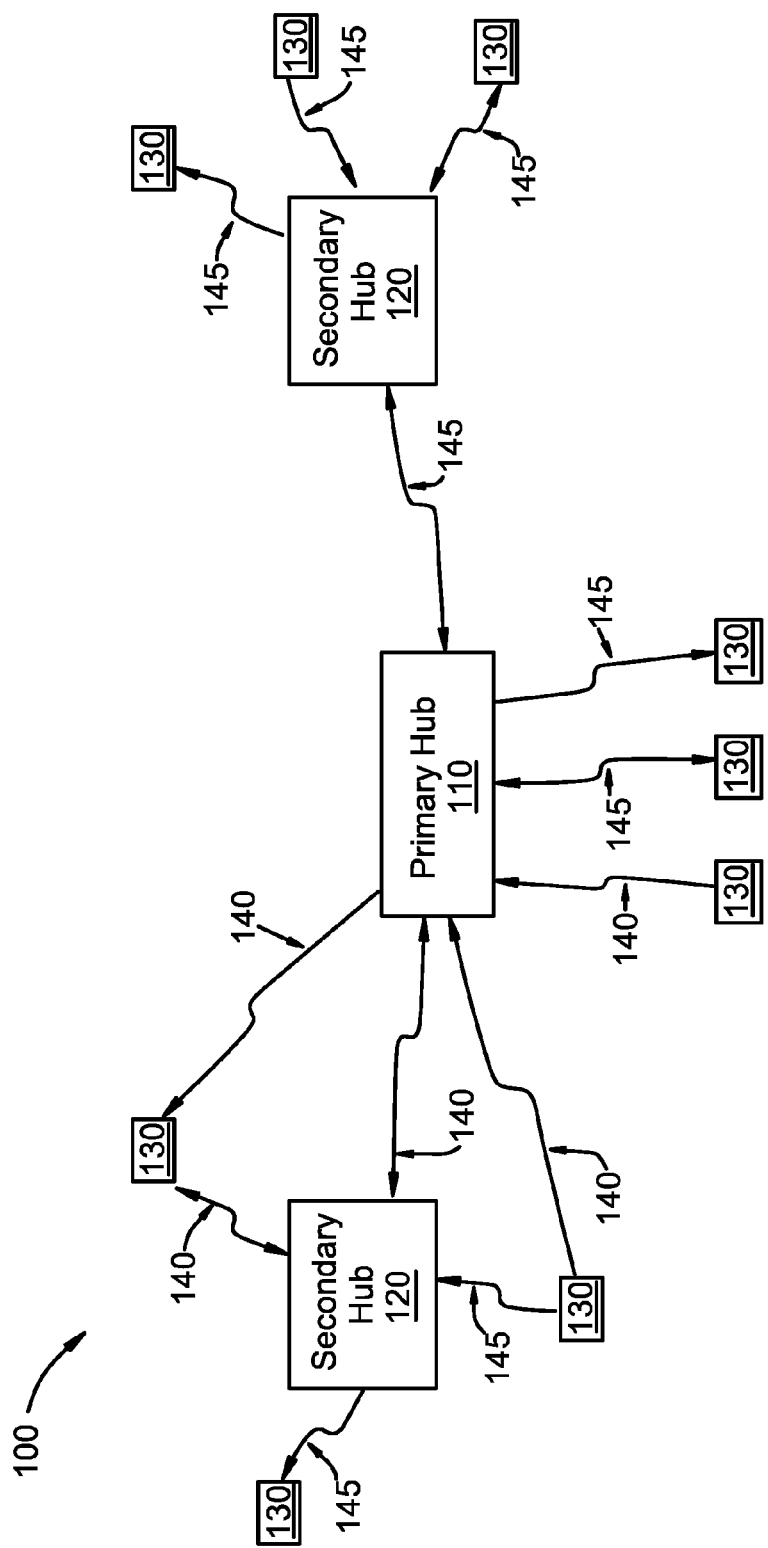
FIG. 1 depicts one embodiment of a tamper-resistant and/or tamper-proof dual modulation network.

A detailed description of the claimed invention is provided below by example, with reference to embodiments in the appended figures. Those of skill in the art will recognize that the components of the invention as described by example in the figures below could be arranged and designed in a wide variety of different configurations, including combinations of embodiments described below or other embodiments not described. Thus, the detailed description of the embodiments in the figures is merely representative of embodiments of the invention, and is not intended to limit the scope of the invention as claimed.

In some instances, features represented by numerical values, such as dimensions, mass, quantities, and other properties that can be represented numerically, are stated as approximations. Unless otherwise stated, an approximate value means "correct to within 50% of the stated value." Thus, a length of approximately 1 inch should be read "1 inch+/−0.5 inch."

Throughout this specification, words like "tamper," "intrude," "attack," and "hack" are used to refer to an attempt by an unauthorized entity to access the firmware or internal hardware of a device. For example, a hacker may attempt to hack, via a network connection, into the firmware of a networked device. Or, an attacker may attempt to physically access the circuitry of the device and obtain information about the device's operation. In general, however, these terms refer to unauthorized attempts, successful or not, to access the firmware or internal hardware of a device in a way that compromise the security of the network. Similarly, terms like "tamper-resistant" or "tamper-proof" are used to describe a device's ability to resist attacks. Tamper-resistant thus means a device can resist security attacks, but may still have exploitable vulnerabilities that allow an attacker to circumvent the tamper-resistant features. Tamper-proof means a device can resist security attacks, and there are no exploitable vulnerabilities.

All or part of the present invention may be embodied as a system, method, and/or computer program product. The computer program product may include a computer readable storage medium (or media) having computer readable program instructions thereon for causing a processor to carry out aspects of the present invention. For example, the computer program product may include firmware programmed on a microcontroller.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, a chemical memory storage device, a quantum state storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming languages such as Smalltalk, C++ or the like, and conventional procedural programming languages such as the "C" programming language or similar programming languages. Computer program code for implementing the invention may also be written in a low-level programming language such as assembly language.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. Those of skill in the art will understand that each block of the flowchart illustrations and/or block diagrams, and combinations of blocks in the flowchart illustrations and/or block diagrams, may be implemented by computer readable program instructions. Additionally, those of skill in the art will recognize that the system blocks and method flowcharts, though depicted in a certain order, may be organized in a different order and/or configuration without departing from the substance of the claimed invention.

These computer readable program instructions may be provided to a processor of a general purpose computer, special purpose computer, embedded system, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 depicts one embodiment of a tamper-resistant and/or tamper-proof dual modulation network 100 according to the claimed invention. Dual modulation network 100 includes primary network hub (PNH) 110, one or more secondary network hubs (SNH) 120 located remotely from PNH 110 within a PNH-SNH transmit-receive range, and one or more peripheral devices (PD) 130. The PDs 130 are located remotely from the PNH 110 and the SNH 120 within at least one of a PNH-PD transmit-receive range or a SNH-PD transmit-receive range. PNH 110 has one or more long range transceivers and one or more microcontrollers having communication firmware for long range spread spectrum (SS) and narrowband frequency shift keying (FSK) signal communication via the PNH long range transceiver. SNH 120 similarly has one or more long range transceivers and one or more microcontrollers having communication firmware for long range SS and narrowband FSK signal communication via the SNH long range transceiver. PD 130 also has, in one embodiment of dual modulation network 100, an actuation mechanism, at least one long range transceiver and at least one corresponding microcontroller having communication firmware for long range SS and narrowband FSK signal communication via the PD 130 long range transceiver. In another embodiment, PD 130 has an actuation mechanism, at least one receiver and at least one corresponding microcontroller having receive firmware for long range SS and narrowband FSK signal communication. In yet another embodiment, PD 130 has an actuation mechanism, at least one transmitter and at least one corresponding microcontroller having transmit firmware for long range SS and narrowband FSK signal communication.

As used throughout the claims and specification, long range means any range from 0.5 to 30 miles. In some embodiments, long range means approximately 1 mile. In other embodiments, long range means ranging from 1 to 26 miles. In yet other embodiments, long range means approximately 10 miles. However, long range can also refer to a level of obstruction between a transmitter and a receiver. Obstructions include any structure or physical phenomenon that interferes with, but does not completely attenuate, radio frequency signals. In such cases, long range means, in some embodiments, ranging from 100 to 6,000 feet with obstructions. Long range also means, in other embodiments, ranging from 1 to 26 miles with obstructions. In yet other embodiments, long range means approximately 10 miles with obstructions.

PNH 110, SNH 120, and/or PD 130 communicate via long range SS signals 140 and/or narrowband FSK signals 145 based on a range between communicating devices. For example, in one embodiment, PNH 110 communicates with one PD 130 via long range SS signals 140 and with a second PD 130 via narrowband FSK signals 145. In such an example, this configuration would be particularly beneficial where the first PD 130 is outside a PNH-PD narrowband FSK communication range but within a PNH-PD long range SS communication range. In another embodiment, a PD 130 is mobile. PNH 110 communicates with PD 130 via narrowband FSK signals 145 when PD 130 is within the PNH-PD narrowband FSK range, and via long range SS signals 140 when PD 130 is outside the PNH-PD narrowband FSK range. In another embodiment, PNH 110 communicates with PD 130 via long range SS signals 140 even when PD 130 is within the PNH-PD narrowband FSK range. This is beneficial in embodiments where additional security is desired, such as for PDs 130 susceptible to malicious hardware and/or software intrusions.

Many PDs are controlled by instructions consisting of hundreds of bits to hundreds of kilobits of data. Such instructions thus do not need to be communicated over high-data rate networks, thus decreasing the power consumed in transmitting and receiving information. Rather, low-data instructions can be transmitted via a low-data rate signal while still having a fast response time, such as within one second. This is particularly important for battery-operated PDs. PD 130 is, in some embodiments, battery-operated and controlled by instructions consisting of hundreds of bits to hundreds of thousands of bits. In one embodiment, PD 130 requires from 100 bits to 500 kilobits of data for instruction. In this embodiment, long range SS signals 140 communicate instructions to PD 130 at a rate from 100 bits per second (bps) to 500 kilobits per second (kbps). In another embodiment, PD 130 requires from 200 bits to 300 kilobits of data for instruction. In this other embodiment, long range SS signals 140 communicate instructions to PD 130 at a rate from 200 bps to 300 kbps. In yet another embodiment, PD 130 requires from 1 to 100 kilobits of data for instruction. In this embodiment, long range SS signals 140 communicate instructions to PD 130 at a rate from 1 to 100 kbps.

In one example, PNH 110 communicates with SNH 120 via long range SS signals 140. SNH 120 processes communications from PNH 110 and forwards information to PD 130 via narrowband FSK signals 145. Similarly, in another embodiment, SNH 120 receives information from PNH 110 via narrowband FSK signals 145, processes the information, and forwards information to PD 130 via long range SS signals 140. As another example, communication between PNH 110, SNH 120 and PD 130 is accomplished via solely long range SS signals 140 or solely narrowband FSK signals 145.

Long range SS signals 140 are any time of a variety of spread spectrum signals. For example, in one embodiment, long range SS signals 140 are long range spread spectrum frequency hopping (SSFH) signals. In another embodiment, long range SS signals 140 are long range direct-sequence spread spectrum (DSSS), time-hopping spread spectrum (THSS), or chirp spread spectrum (CSS) signals. Other embodiments include combinations of two or more of SSFH, DSSS, THSS, and/or CSS signals. In embodiments comprising SSFH, DSSS, THSS, and/or CSS signals, the microcontrollers described above include firmware having instructions for communicating using these signals. For example, in one embodiment, the PNH microcontroller firmware includes instructions for long range SSFH signal communication. In the same or another embodiment, the SNH microcontroller firmware similarly includes instructions for long range SSFH signal communication. Additionally, in the same or other embodiments, the PD microcontroller firmware includes instructions for long range SSFH signal communication. In one embodiment, the microcontroller firmware of the PNH, SNH and PD all include instructions for long range SSFH signal communication.

In one embodiment, each SNH 120 is associated with a particular group of PDs 130, where each PD 130 is associated with only one SNH 120. PNH 110 stores high-level system operation information and instructions. The system operation information and instructions include operation instructions for SNHs 120 and PDs 130, and information about which PD 130 is associated with which SNH 120. PNH 110 transmits operation information and instructions to each SNH 120 for that hub only and its associated PDs. SNH 120 stores the operation information and instructions sent by PNH 110 and transmits and/or receives information, including instructions, to and/or from its associated PDs 130. Thus, PNH 110 acts as a system-wide control hub, and SNHs 120 act as local control hubs. This embodiment allows for robust communication with many devices while avoiding the interference and lag time of a single-hub system.

PD 130 may be any of a variety of apparatuses that include an actuation mechanism. In one embodiment, PD 130 is a gate for an access-controlled enclosure. For example, the enclosure, in one embodiment, is a perimeter fence surrounding a property such as a business, home, industrial complex, prison, or other access-controlled enclosures. In another embodiment, PD 130 is a door for allowing access to a structure or room within a structure. In one embodiment, PD 130 is a climate-control device, such as for an HVAC system, for adjusting heating and cooling output inside a building. In yet another embodiment, PD 130 is an automated blind system and/or a light switch and/or system of light switches. PD 130 is also, in some embodiments, any of various household appliances, such as a refrigerator, stove, oven, dishwasher, clothes washing machine, clothes dryer, toilet, bath and/or shower, and kitchen appliances. In other embodiments, PD 130 is a personal computer, a printer/scanner, a fax machine and/or a telephone.

PD 130 is also, in some embodiments, any of a variety of commercial and/or industrial equipment. For example, in one embodiment, PD 130 is an elevator. In another embodiment, PD 130 is one of a variety of manufacturing equipment, such as a conveyor belt, a pump, a sensor, a motor, and/or a 3D printer. In yet other embodiments, PD 130 is a vehicle and/or a vehicle component such as a starter or a motor. In one embodiment, PD 130 is a drone.

Dual modulation network 100 is a stand-alone network that offers several benefits. First, dual modulation network 100 operates independently of the Internet. Thus, PNH 110 can communicate with each SNH 120 and PD 130 even when the external Internet connection is down. Additionally, in some embodiments of dual modulation network 100, PNH 110, SNHs 120 and PDs 130 are equipped with backup power. The backup power is, in some embodiments, local, such as a battery. In the same or other embodiments, the backup power is an off-grid power source such as a generator or batteries. In such embodiments, connectivity between PNH 110, SNHs 120 and PDs 130, and operability of each, continues through a grid-power outage.

An additional benefit of the stand-alone dual modulation network described above is inherent security. In order for a device to interpret a long range SS signal, it must know which frequencies to check. In dual modulation network 100, each of PNH 110, SNHs 120 and PDs 130 are programmed with a unique frequency sequence for dual modulation network 100. External observers not aware of the unique frequency sequence would interpret the signals from dual modulation network 100 as noise, even if the observer were trying to intercept signals from dual modulation network 100. For added security, PNH 110, SNHs 120 and/or PDs 130 include tamper circuits and firmware that notifies an authorized user that the device has been tampered with before an unauthorized user can obtain the frequency sequence, automatically changes the frequency sequence, and updates other devices on the network with the new frequency sequence. For example, PNH 110 receives a tamper signal from PD 130. PNH 110 changes the frequency sequence and updates SNHs 120 and other PDs 130 with the new sequence. PNH 110 then notifies an authorized user that PD 130 has been tampered with and the frequency sequence has been updated.

The foregoing PD 130 embodiments described are examples only, and are not to be construed as limiting the scope of PD 130. Rather, PD 130 is any device or system that includes an actuation mechanism that performs a tangible function, such as turning a light in a room on or off, unlocking and/or opening a gate, and opening and/or closing blinds.

Figure 2:
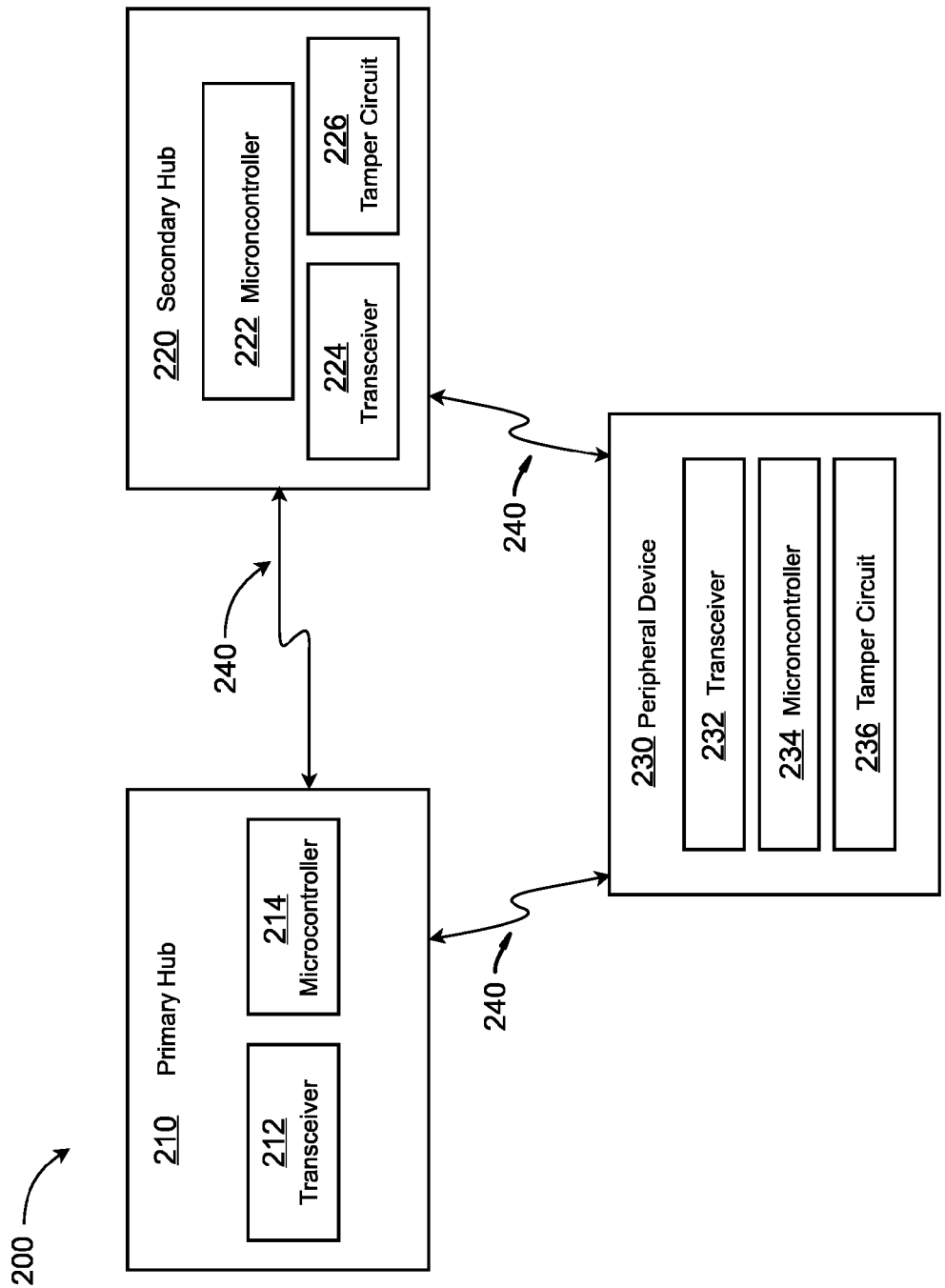
FIG. 2 depicts another tamper-resistant and/or tamper-proof dual modulation network.

FIG. 2 depicts another tamper-resistant and/or tamper-proof dual modulation network 200. PNH 210 includes transceiver 212, and microcontroller 214. Similarly, SNH 220 includes transceiver 222 and microcontroller 224, but additionally includes and tamper circuit 226. PD 230 includes transceiver 232, microcontroller 234, and tamper circuit 236. PNH 210, SNH 220 and PD 230 communicate via wireless signals 240. Wireless signals 240 are any type of wireless signal. For example, in one embodiment, wireless signals 240 are long range SS signals such as SSFH, DSSS, THSS and/or CSS on the 900 MHz ISM band, or narrowband FSK signals on the 900 MHz ISM band.

PD 230 is any one of the various devices described above with regard to PD 130 in FIG. 1. Memories 212 and 222 are any of a variety of non-volatile memory devices such as ROM, flash, hard disk, and/or optical disk. Similarly, microcontrollers 214, 224 and 232 are, in some embodiments, any of a variety of of-the-shelf microcontrollers. Transceivers 216, 226 and 234 are also, in some embodiments, any of a variety of off-the-shelf 900 MHz ISM band transceivers. For example, in various embodiments, one or more of transceivers 216, 226 and 234 are Long range transceivers.

Microcontroller 214 and transceiver 212 are, in some examples, networked via a printed circuit board (PCB). However, in some embodiments, microcontroller 214 and transceiver 216 are networked in a network-on-chip (NoC) architecture. Similarly, in some embodiments, microcontroller 224 and transceiver 226 are networked via PCB, whereas in some other embodiments, microcontroller 224 and transceiver 226 are networked in a NoC architecture. Additionally, in some embodiments, microcontroller 232 and transceiver 234 are networked via PCB, whereas in other examples microcontroller 232 and transceiver 234 are networked in a NoC architecture.

Memory 212 is networked to microcontroller 214 and transceiver 216. Similarly, memory 222 is networked to microcontroller 224 and transceiver 226. This networking may be accomplished by any of a variety of means, such as via PCB, ribbon cable, NoC architecture, or a combination thereof. Thus, in some embodiments, memory 212 and microcontroller 214 are networked via PCB, ribbon cable, NoC architecture, or a combination thereof. Similarly, in some embodiments, memory 222 and microcontroller 224 are networked via PCB, ribbon cable, NoC architecture, or a combination thereof.

PNH 210, SNH 220 and PD 230 may be powered by any of a variety of means. For example, as depicted, PD 230 includes a battery in some embodiments. However, in other embodiments, PD 230 is powered via a standard electrical outlet or another external power source. PNH 210 and SNH 220 are powered via standard electrical outlets or another external power source in some embodiments, but also include, in such and other embodiments, backup batteries in case of power failure. In some embodiments, PD 230 also includes a backup battery in case battery 238 fails.

Figure 3:
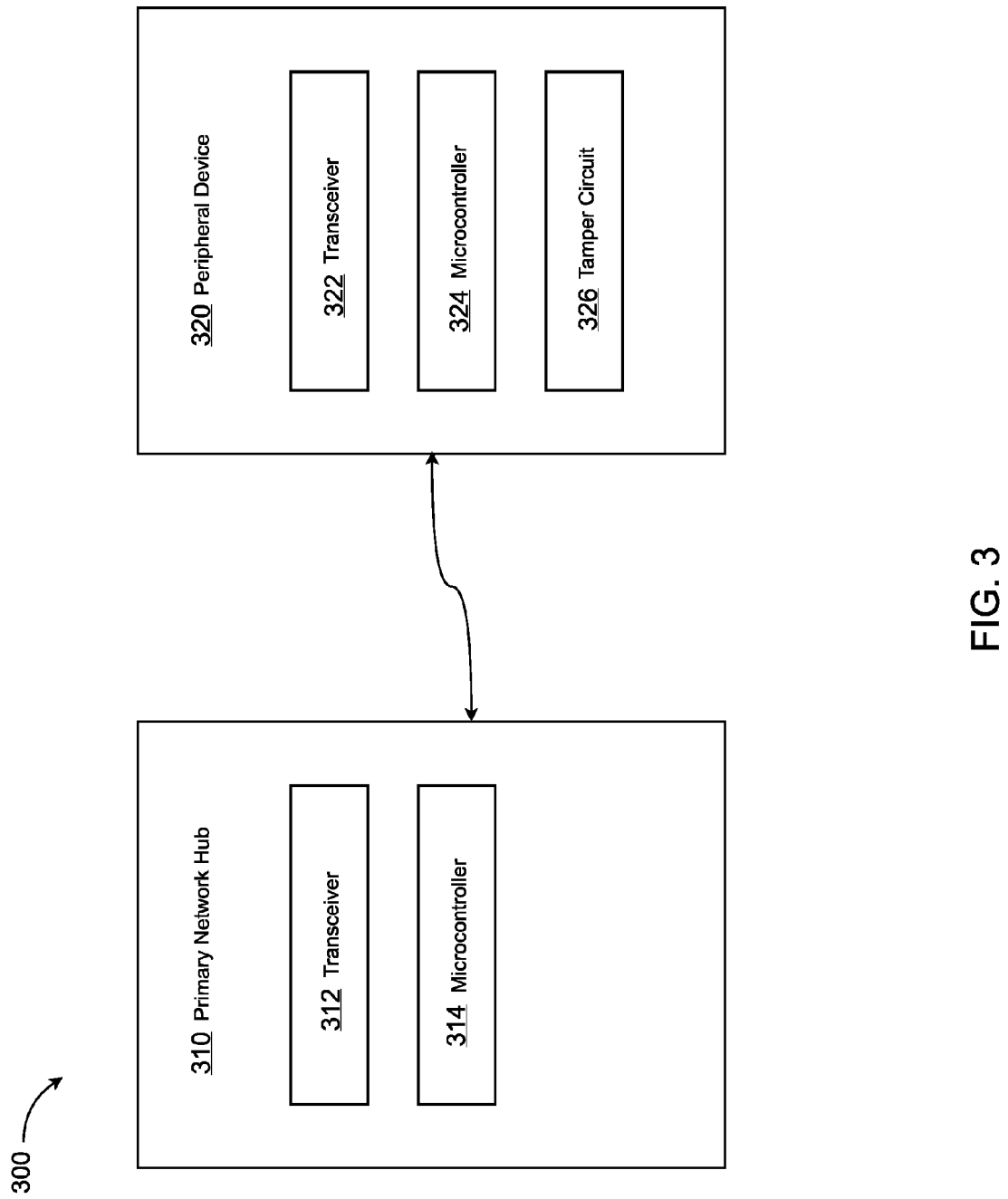
FIG. 3 depicts another embodiment of a tamper-resistant or tamper-proof dual modulation network.

FIG. 3 depicts another embodiment of a tamper-resistant or tamper-proof dual modulation network similar to network 200, including only a PNH and a PD. Similar to network 200, PNH 310 includes transceiver 312 and microcontroller 314, and PD 320 includes transceiver 322, microcontroller 324, and tamper circuit 326.

Figure 4:
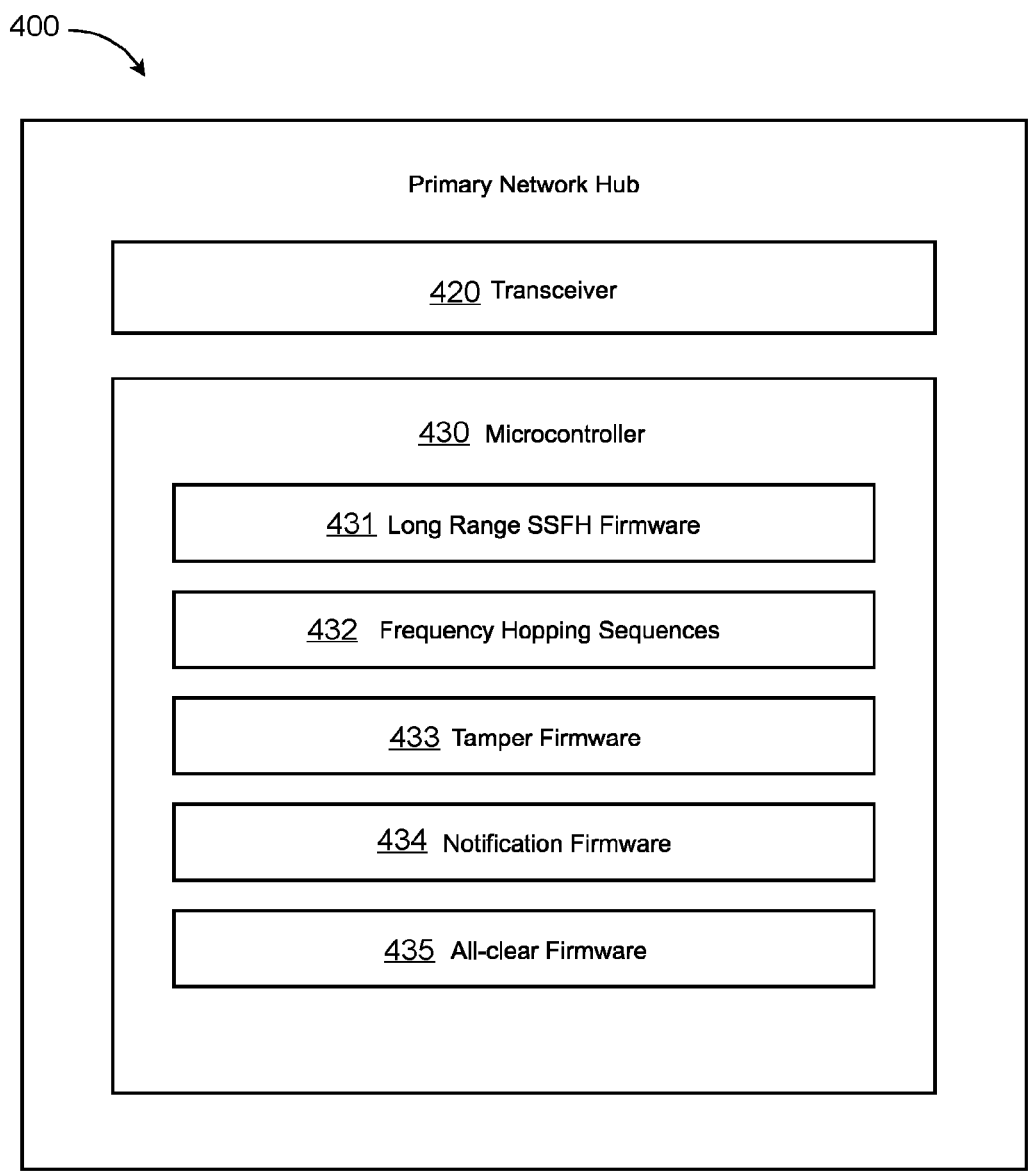
FIG. 4 depicts an embodiment of an example primary network hub for use in a tamper-resistant or tamper-proof dual modulation network.

FIG. 4 depicts an embodiment of an example PNH for use in a tamper-resistant or tamper-proof dual modulation network such as those described above. PNH 400 includes transceiver 420 and microcontroller 430. Microcontroller 430 further includes long range SSFH firmware 431, frequency hopping sequences 432, tamper firmware 433, notification firmware 434, and all-clear firmware 435. In some embodiments, though not shown, PNH 400 also includes a tamper circuit.

Long range SSFH firmware 431 includes instructions that instruct transceiver 420 to communicate information via long range SSFH wireless signals. Additionally, long range SSFH firmware 431 includes instructions for selecting one of frequency hopping sequences 432 to communicate with an SNH or PD (not shown here, but as in other depicted embodiments). For example, in one embodiment, microcontroller 430 selects a secure frequency hopping sequence for transmitting data to a PD and transmits the data via a long range SSFH signal.

Tamper firmware 433 includes instructions that deactivate a frequency hopping signal upon notification that the frequency hopping signal is compromised. For example, in one embodiment, a PD sends a signal, which is received at transceiver 420, notifying PNH 400 that the PD is tampered with and that one or more frequency hopping sequences are compromised. Using tamper firmware 433, microcontroller 430 deactivates the compromised frequency hopping sequences. Notification firmware 434 includes instructions that instruct the transceiver 420 to send a signal notifying one or more PNH-networked devices, such as the PDs depicted in dual modulation network 100, that one or more of frequency hopping sequences 432 are compromised. All-clear firmware 435 includes instructions for notifying the PNH-networked devices a frequency hopping sequence is secured.

In some embodiments, though not depicted, PNH 400 includes a tamper circuit. In such embodiments, the tamper circuit notifies microcontroller 430 that PNH 400 is tampered with. Tamper firmware 433 includes instructions for notifying the PNH-networked devices that the PNH is compromised. The PNH-networked devices each include a microcontroller having PNH networked-device firmware with instructions that lock the PNH-networked device, preventing the PNH-networked device from operating. Once the PNH is secured, all-clear firmware 435 includes instructions that instruct transceiver 420 to transmit an all-clear signal that notifies the PNH-networked devices the PNH is secure. The PNH-networked device firmware includes instructions that unlock the PNH-networked device for operation when the PNH-networked device in notified that the PNH is secure.

Figure 5:
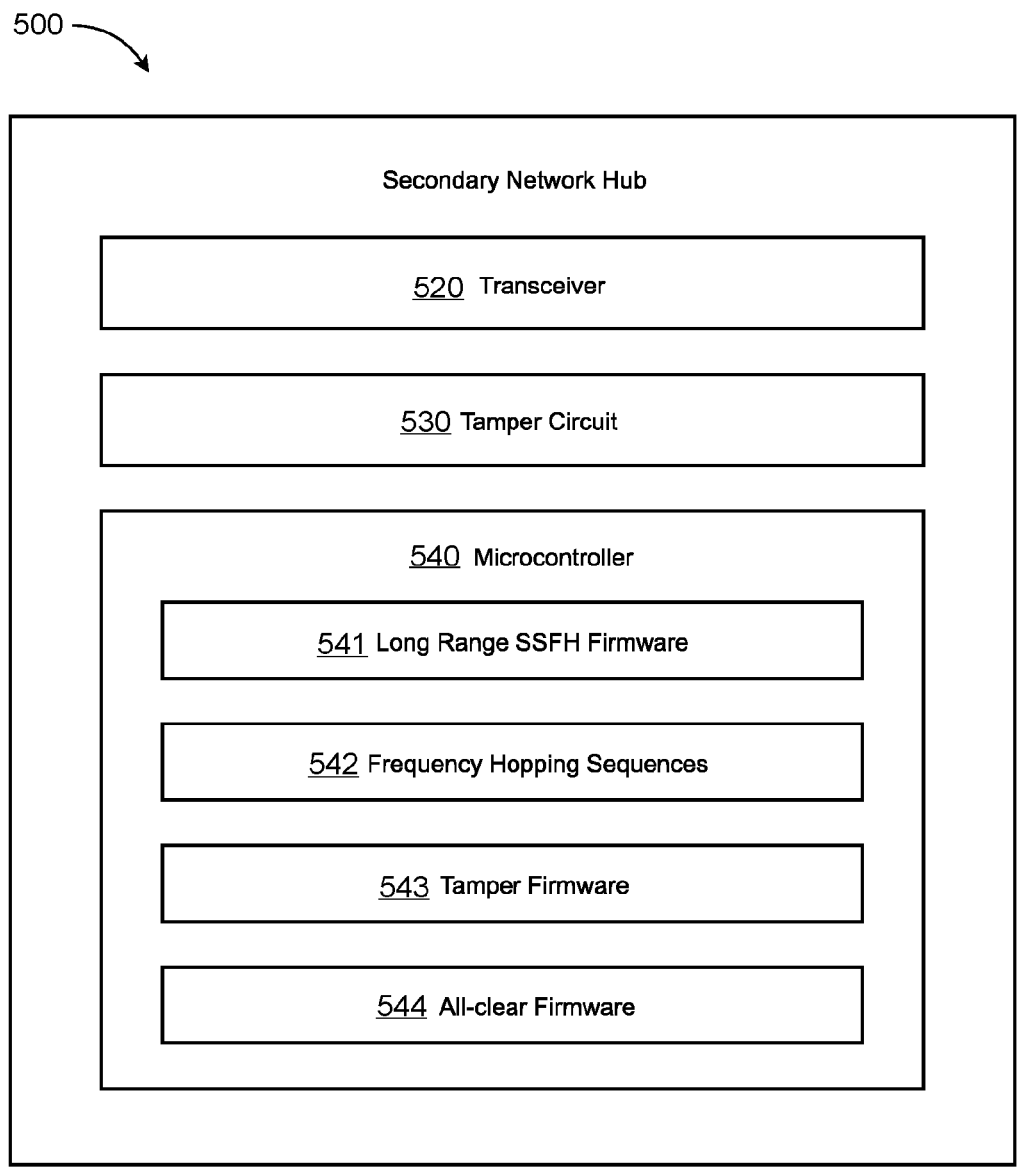
FIG. 5 depicts an embodiment of an example secondary network hub for use in a tamper-resistant or tamper-proof dual modulation network.

FIG. 5 depicts an embodiment of an example SNH for use in a tamper-resistant or tamper-proof dual modulation network such as those described above. SNH 500 includes transceiver 520, tamper circuit 530, and microcontroller 540. Microcontroller 540 further includes long range SSFH firmware 541, frequency hopping sequences 542, tamper firmware 543, and all-clear firmware 544.

Long range SSFH firmware 541 includes instructions that instruct transceiver 520 to communicate information via long range SSFH wireless signals. Additionally, long range SSFH firmware 541 includes instructions for selecting one of frequency hopping sequences 542 to communicate with a PNH or PD (not shown here, but as in other depicted embodiments). For example, in one embodiment, microcontroller 540 selects a secure frequency hopping sequence for transmitting data to a PD and transmits the data via a long range SSFH signal.

Tamper firmware 543 includes instructions that instruct SNH 500 to notify the PNH that one or more of the plurality of frequency hopping sequences has been compromised. For example, in one embodiment, a PD sends a signal, which is received at transceiver 520, notifying SNH 500 that the PD is tampered with and that one or more frequency hopping sequences are compromised. Using tamper firmware 543, microcontroller 540 instructs transceiver 520 to send a signal notifying the PNH that the frequency hopping sequences are compromised. In another embodiment, an attacker attempts to tamper with SNH 500. Tamper circuit 530 notifies microcontroller 540 that SNH 500 is tampered with. Tamper firmware 543 includes instructions that instruct SNH 500 to notify the PNH that one or more of the plurality of frequency hopping sequences has been compromised. Additionally, tamper firmware 543 includes instructions that instruct transceiver 520 to send a signal notifying one or more SNH-networked devices, such as the PDs depicted in dual modulation network 100, that one or more of frequency hopping sequences 542 are compromised. The SNH-networked devices, in some embodiments, include a SNH networked-device microcontroller having SNH networked-device firmware. The SNH networked-device firmware includes instruction that lock the SNH-networked device, preventing the SNH-networked device from operating. All-clear firmware 435 includes instructions for notifying the SNH-networked devices a frequency hopping sequence is secured. In some embodiments, the SNH networked-device firmware includes instructions that unlock the SNH-networked device for operation when the SNH-networked device is notified that the SNH is secure.

Figure 6:
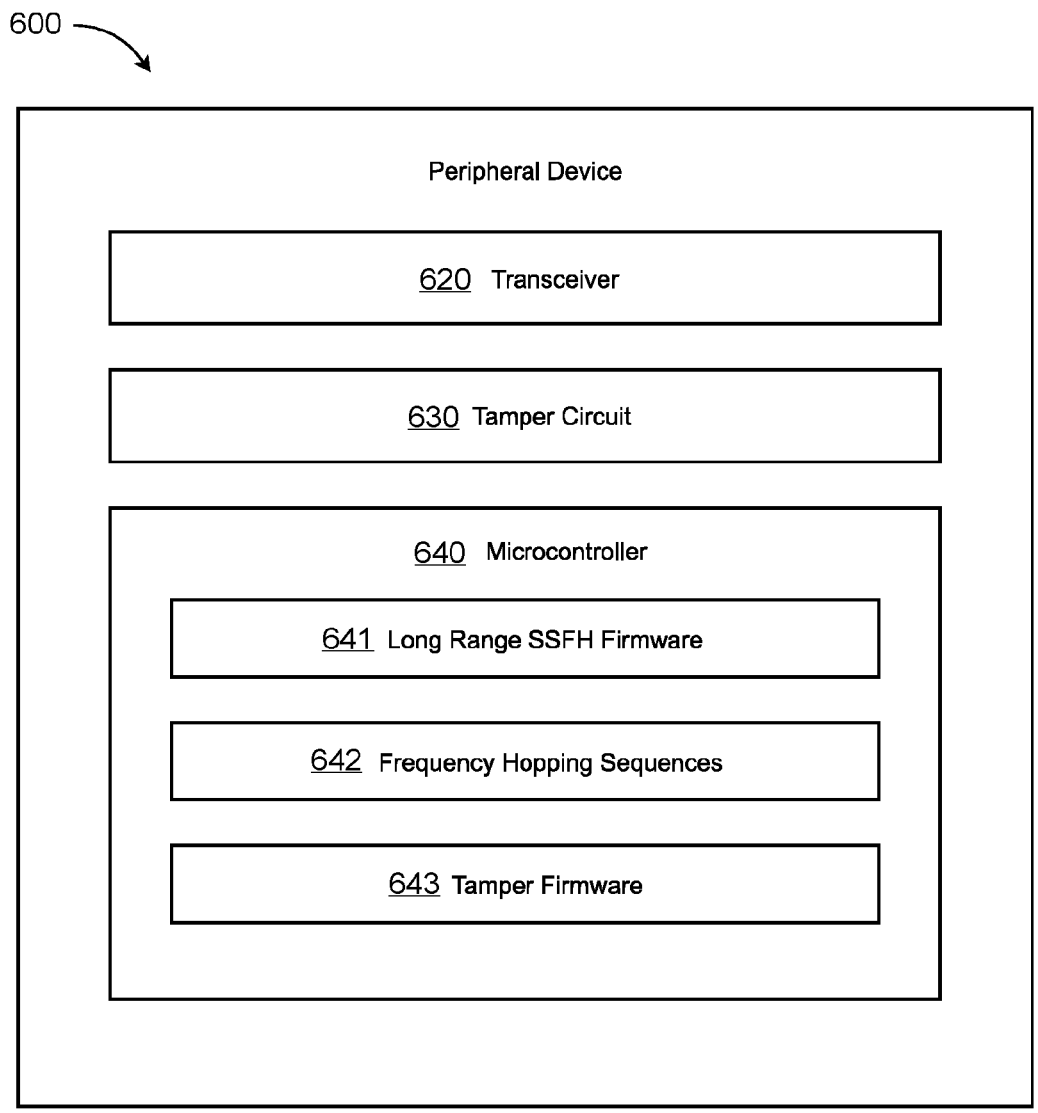
FIG. 6 depicts an embodiment of an example peripheral device for use in a tamper-resistant or tamper-proof dual modulation network.

FIG. 6 depicts an embodiment of an example PD for use in a tamper-resistant or tamper-proof dual modulation network such as those described above. PD 600 includes transceiver 620, tamper circuit 630, and microcontroller 640. Microcontroller 640 further includes long range SSFH firmware 641, frequency hopping sequences 642, and tamper firmware 543.

Long range SSFH firmware 641 includes instructions that instruct transceiver 620 to communicate information via long range SSFH wireless signals. Additionally, long range SSFH firmware 641 includes instructions for interpreting one of frequency hopping sequences 542 communicated by a PNH or SNH (not shown here, but as in other depicted embodiments). For example, in one embodiment, transceiver 620 receives a long range SSFH signal and microcontroller 640 correlates the signal with a secure frequency hopping sequence. In some embodiments, the long range SSFH signal includes instructions, and upon receive of the instructions, microcontroller 640 executes those instructions.

Tamper firmware 643 includes instructions that instruct PD 600 to notify the PNH and/or SNH that one or more of the plurality of frequency hopping sequences has been compromised. For example, in one embodiment, an attacker attempts to physically access internal circuitry of PD 600. Tamper circuit 630 sends a signal to microcontroller 640 that the device is tampered with. Using the tamper firmware 643 instructions, PD 600 transmits, via transceiver 620, a signal notifying the PNH and/or SNH that PD 600 is tampered with and that one or more frequency hopping sequences are compromised.

The frequency hopping sequences, like those described with reference to FIGS. 4, 5 and 6, are beneficial because they are only known to devices programmed with the sequences; they cannot be hacked without hacking the hardware of the device. However, if the device hardware is attacked, the frequency hopping sequences can be determined. It is one objective of this invention to overcome this vulnerability by notifying a PNH when a PD has been compromised, and to remove the frequency hopping sequence or sequences used to communicate with the compromised PD from a secure frequency hopping sequence list. Thus, in many embodiments, the PNH includes a secure frequency hopping sequence list and an unsecure frequency hopping sequence list. When a device tries to use an unsecure frequency hopping sequence, the PNH notifies a user that unauthorized access is being attempted.

Figure 7:
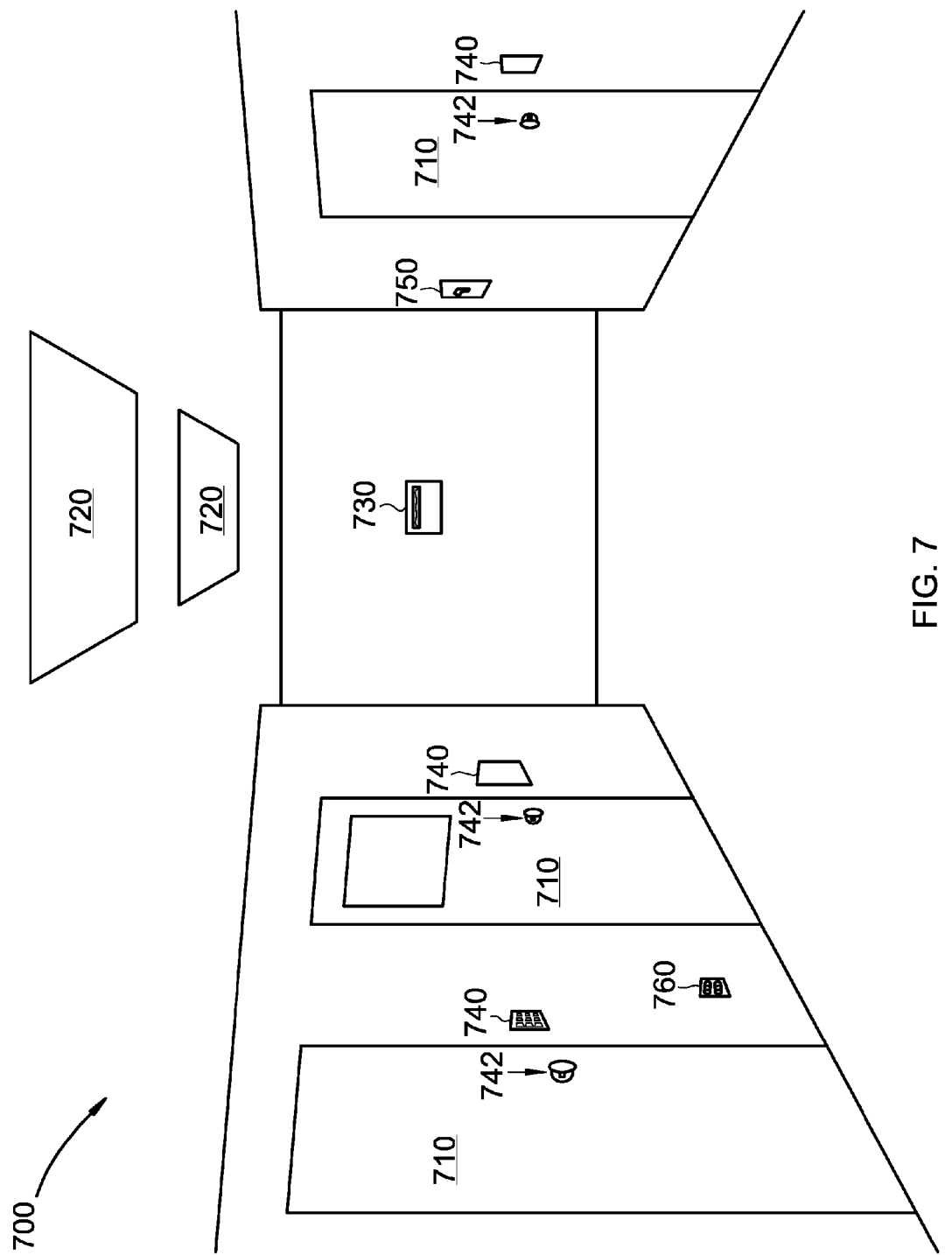
FIG. 7 depicts several example embodiments of peripheral devices.

FIG. 7 depicts several example embodiments of PDs that are operable with the system described herein. Office environment 700 includes access-control doors 710, lights 720, and thermostat 730. Doors 710 are secured by access pads 740 and actuators 742. In one embodiment, access pad 740 is a pin pad, and actuator 742 is a door knob. In an alternative embodiment, access pad 740 is a magnetic card or chip reader. Additionally, in some embodiments, Doors 710 are electronically actuated without knobs or handles. Access pad 740 includes the features described above with regard to PD 600, including a transceiver, microcontroller, and tamper circuit. When an unauthorized pin is entered into access pad 740, access pad 740 notifies a PNH via the transceiver, but the frequency hopping sequences used to communicate between the PNH and access pad 740 remain secure. However, when the physical integrity of access pad 740 is compromised, the tamper circuit triggers the transceiver to send a signal notifying the PNH the frequency hopping sequences are compromised, and shuts down operability of access pad 740.

Similar to doors 710, lights 720 are controlled by light switch 750. Alternatively, lights 720 are controlled non-locally by a physical or software master switch. Light switch 740 includes the features described above with regard to PD 600, including a transceiver, microcontroller, and tamper circuit. When the physical integrity of light switch 750 is compromised, the tamper circuit triggers the transceiver to send a signal notifying the PNH the frequency hopping sequences are compromised, and shuts down operability of light switch 750. In some such cases, lights 720 are still switchable by, for example, a non-local physical or software master switch.

Thermostat 730 controls the HVAC of office environment 700, and includes the features described above with regard to PD 600, including a transceiver, microcontroller, and tamper circuit. When the physical integrity of thermostat 730 is compromised, the tamper circuit triggers the transceiver to send a signal notifying the PNH the frequency hopping sequences are compromised, and shuts down operability of thermostat 730. In some such cases, the HVAC is still controlled by other thermostats 730, or by a master hardware or software thermostat.

In some embodiments, office environment 700 includes, as a PD, outlet 760. For example, having remote communication with room and building outlets helps businesses determine power consumption and where energy savings can be made. Outlet 760 includes a transceiver, microcontroller, and tamper circuit. When the physical integrity of outlet 760 is compromised, the tamper circuit triggers the transceiver to send a signal notifying the PNH the frequency hopping sequences are compromised, and shuts down operability of outlet 760.

Figure 8:
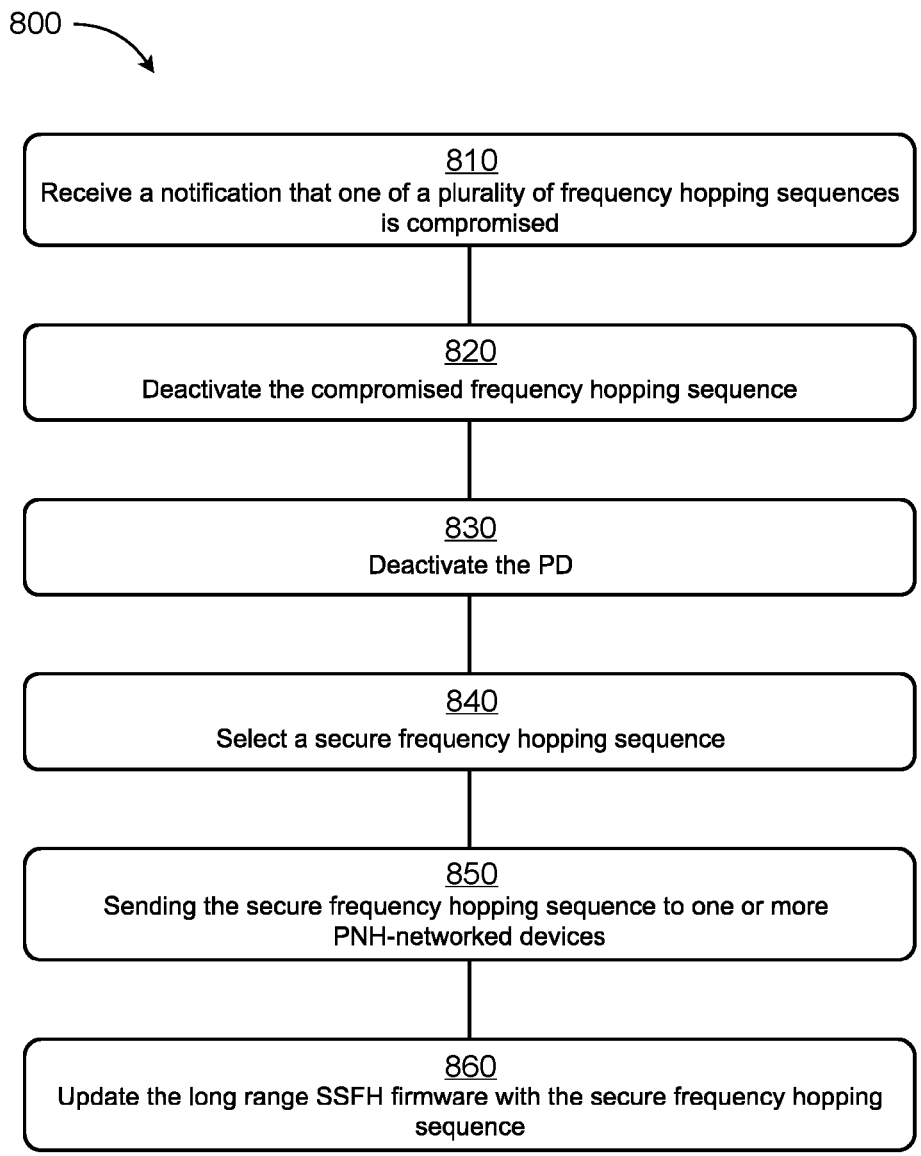
FIG. 8 depicts one embodiment of a method for communicating using a tamper-resistant or tamper-proof dual modulation network.

FIG. 8 depicts one embodiment of a method, method 800, for communicating using a tamper-resistant or tamper-proof dual modulation network. At block 810, a PNH receives a notification that one of a plurality of frequency hopping sequences is compromised. The notification is transmitted by a peripheral device (PD) having a tamper circuit, and the tamper circuit notifies the PD that the compromised frequency hopping sequence is compromised. At block 820, the compromised frequency hopping sequence is deactivated. A PNH microcontroller comprises deactivation firmware that removes the compromised frequency hopping sequence from the plurality of frequency hopping sequences. At block 830, the PD is deactivated. At block 840, a secure frequency hopping sequence is selected from the plurality of frequency hopping sequences. At block 850, the secure frequency hopping sequence is sent to one or more PNH-networked devices. The PNH-networked devices each include a PNH networked-device microcontroller having long range spread spectrum frequency hopping (SSFH) firmware. At block 860, the long range SSFH firmware is updated with the secure frequency hopping sequence.

In one example implementation of method 800, a PNH receives a notification that a thermostat is tampered-with (for example, by a maligned and indignant employee seeking to freeze-out his coworkers). The PNH deactivates the frequency hopping sequences associated with the thermostat, and the thermostat is deactivated so that it cannot be used to adjust HVAC settings. The PNH then selects a secure frequency hopping sequence and sends that secure sequence to other networked devices. In some embodiments, the PNH notifies the other devices of the unsecure or compromised frequency hopping sequence. The devices update their firmware with the frequency hopping sequence information transmitted by the PNH.

Figure 9:
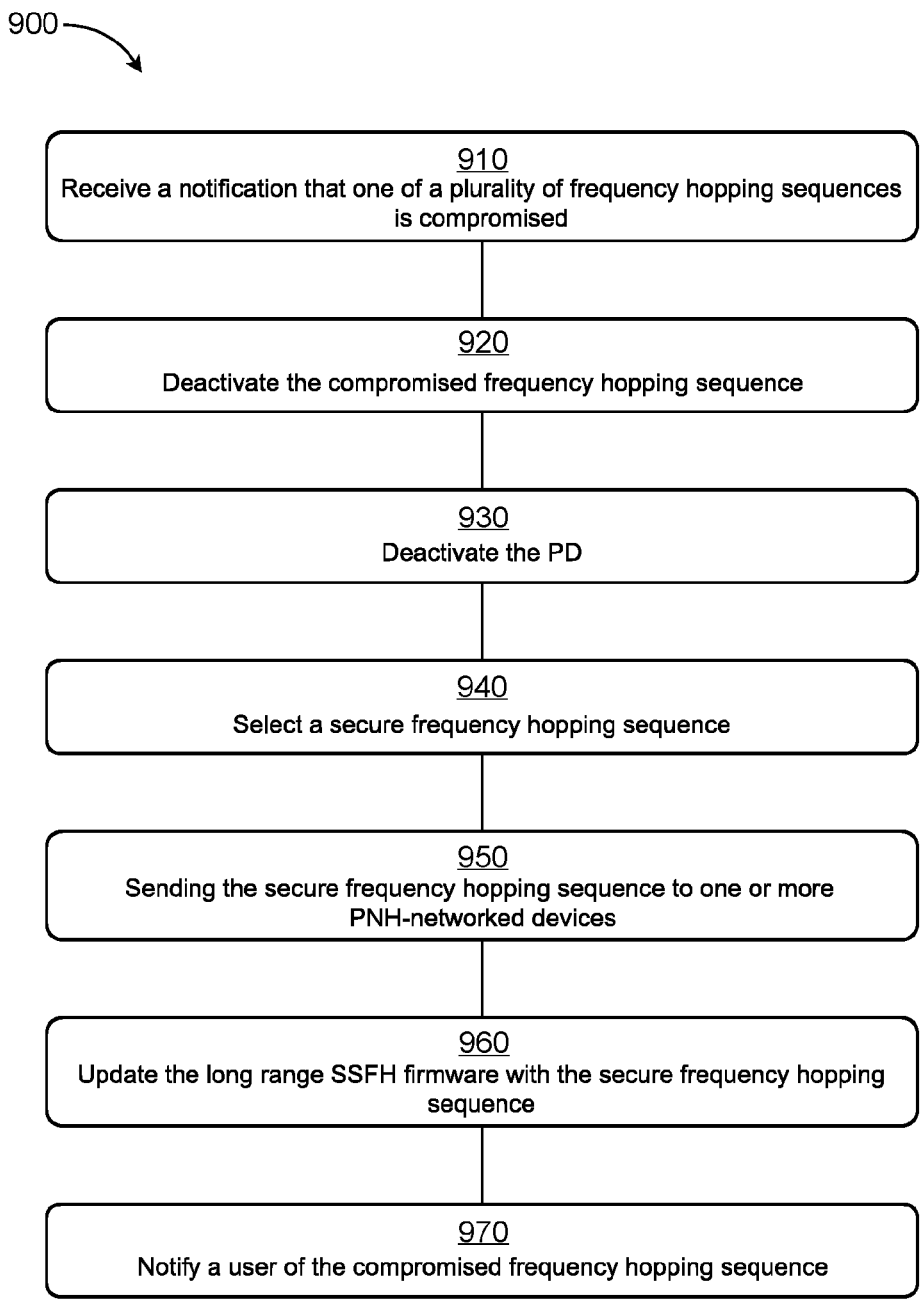
FIG. 9 depicts another embodiment of a method for communicating using a tamper-resistant or tamper-proof dual modulation network.

FIG. 9 depicts another embodiment of a method, method 900, for communicating using a tamper-resistant or tamper-proof dual modulation network. At block 910, a PNH receives a notification that one of a plurality of frequency hopping sequences is compromised. The notification is transmitted by a peripheral device (PD) having a tamper circuit, and the tamper circuit notifies the PD that the compromised frequency hopping sequence is compromised. At block 920, the compromised frequency hopping sequence is deactivated. A PNH microcontroller comprises deactivation firmware that removes the compromised frequency hopping sequence from the plurality of frequency hopping sequences. At block 930, the PD is deactivated. At block 940, a secure frequency hopping sequence is selected from the plurality of frequency hopping sequences. At block 950, the secure frequency hopping sequence is sent to one or more PNH-networked devices. The PNH-networked devices each include a PNH networked-device microcontroller having long range spread spectrum frequency hopping (SSFH) firmware. At block 960, the long range SSFH firmware is updated with the secure frequency hopping sequence. At block 970, a user is notified that the compromised frequency hopping sequence is compromised.

In one example implementation of method 900, a PNH receives a notification that an access pad is tampered-with (for example, an access pad to a freezer full of ice cream being tampered with by sugar-crazed, technology-savvy children). The PNH deactivates the frequency hopping sequences associated with the access pad, and the access pad is deactivated so that it cannot be used to access the freezer. The PNH then selects a secure frequency hopping sequence and sends that secure sequence to other networked devices. In some embodiments, the PNH notifies the other devices of the unsecure or compromised frequency hopping sequence. The devices update their firmware with the frequency hopping sequence information transmitted by the PNH. Finally, the PNH notifies a user, such as a disgruntled parent, that the sugar-crazed children attempted to obtain unauthorized access to the ice cream.

Figure 10:
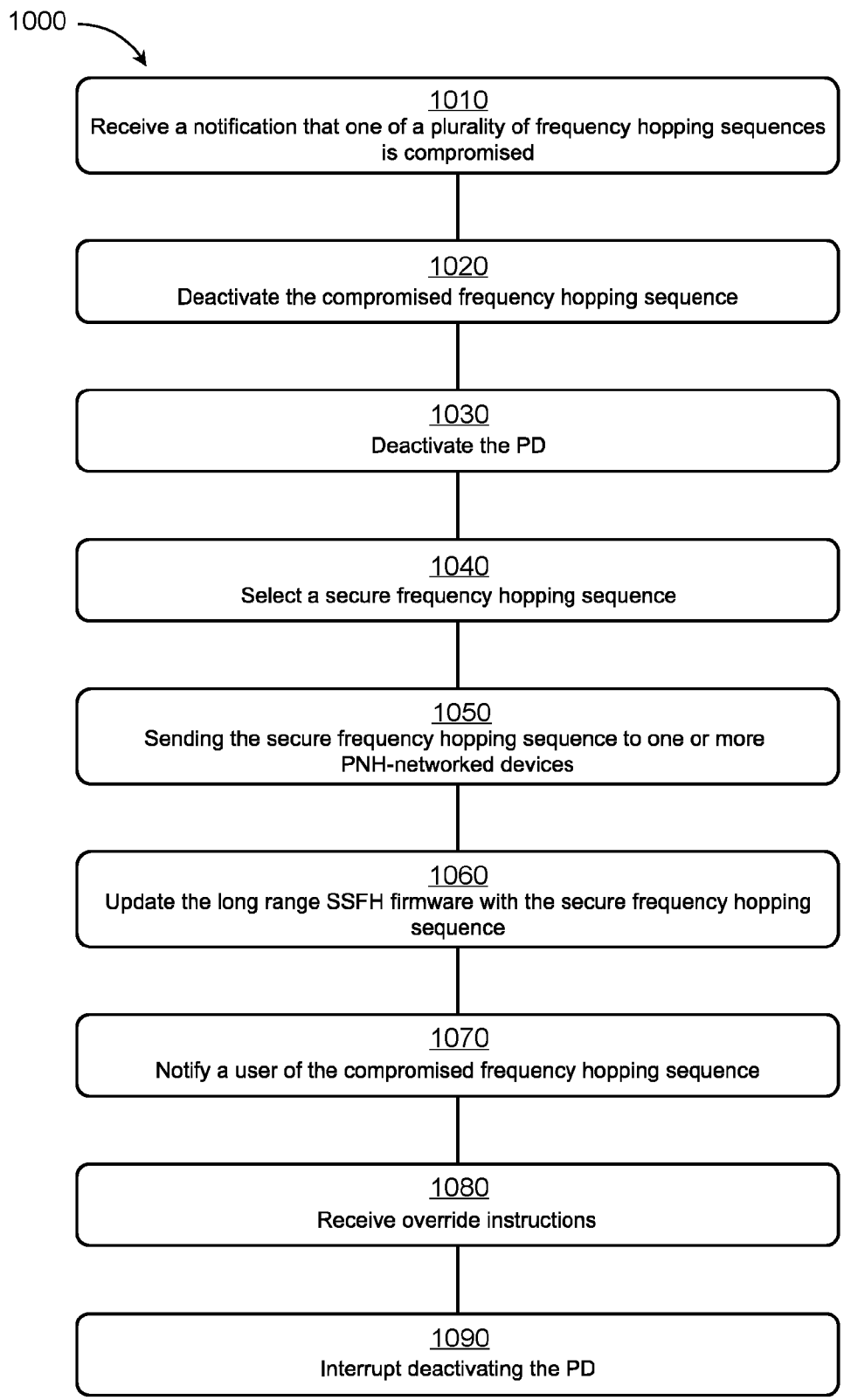
FIG. 10 depicts another embodiment of a method for communicating using a tamper-resistant or tamper-proof dual modulation network.

FIG. 10 depicts another embodiment of a method, method 1000, for communicating using a tamper-resistant or tamper-proof dual modulation network. At block 1010, a PNH receives a notification that one of a plurality of frequency hopping sequences is compromised. The notification is transmitted by a peripheral device (PD) having a tamper circuit, and the tamper circuit notifies the PD that the compromised frequency hopping sequence is compromised. At block 1020, the compromised frequency hopping sequence is deactivated. A PNH microcontroller comprises deactivation firmware that removes the compromised frequency hopping sequence from the plurality of frequency hopping sequences. At block 1030, the PD is deactivated. At block 1040, a secure frequency hopping sequence is selected from the plurality of frequency hopping sequences. At block 1050, the secure frequency hopping sequence is sent to one or more PNH-networked devices. The PNH-networked devices each include a PNH networked-device microcontroller having long range spread spectrum frequency hopping (SSFH) firmware. At block 1060, the long range SSFH firmware is updated with the secure frequency hopping sequence. At block 1070, a user is notified that the compromised frequency hopping sequence is compromised. At block 1080, override instructions are received from an authorized user that interrupt the deactivation of the PD. At block 1090, the deactivation of the PD is interrupted.

In one example implementation of method 1000, a PNH receives a notification that a motion-sensing light switch is tampered-with (for example, by a light switch repair man). The PNH deactivates the frequency hopping sequences associated with the light switch, and the light switch is deactivated so that it cannot be used to change the lights from their current status, either on or off, or dimmed. The PNH then selects a secure frequency hopping sequence and sends that secure sequence to other networked devices. In some embodiments, the PNH notifies the other devices of the unsecure or compromised frequency hopping sequence. The devices update their firmware with the frequency hopping sequence information transmitted by the PNH. Finally, the PNH notifies a user, such as the light switch repair man, that the motion-sensing light switch has been deactivated. The repair man, who was authorized to repair the switch, receives the notification on, for example, a mobile device, and sends an override instruction that interrupts the deactivation of the light switch.

Figure 11:
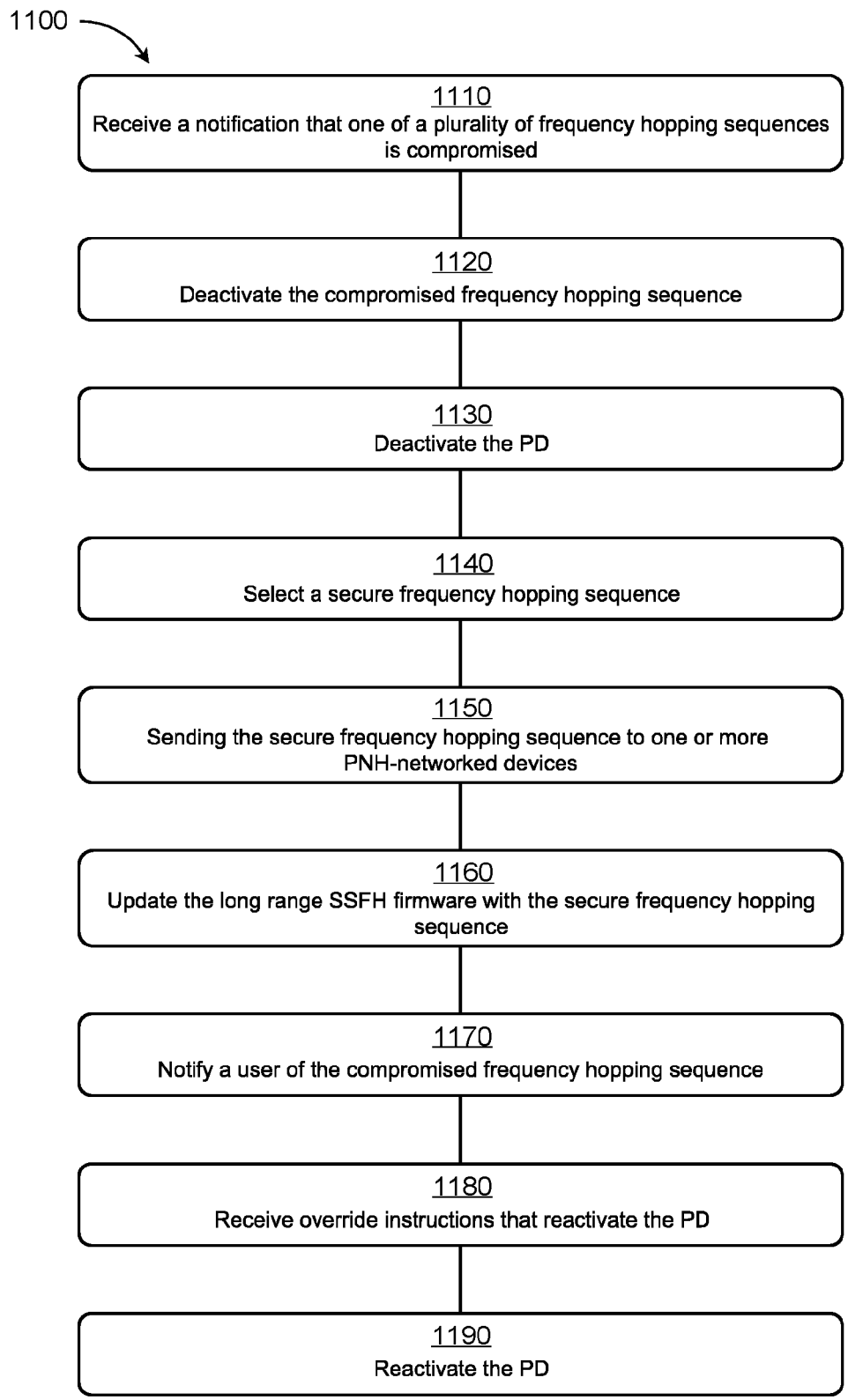
FIG. 11 depicts another embodiment of a method for communicating using a tamper-resistant or tamper-proof dual modulation network.

FIG. 11 depicts another embodiment of a method, method 1100, for communicating using a tamper-resistant or tamper-proof dual modulation network. At block 1110, a PNH receives a notification that one of a plurality of frequency hopping sequences is compromised. The notification is transmitted by a peripheral device (PD) having a tamper circuit, and the tamper circuit notifies the PD that the compromised frequency hopping sequence is compromised. At block 1120, the compromised frequency hopping sequence is deactivated. A PNH microcontroller comprises deactivation firmware that removes the compromised frequency hopping sequence from the plurality of frequency hopping sequences. At block 1130, the PD is deactivated. At block 1140, a secure frequency hopping sequence is selected from the plurality of frequency hopping sequences. At block 1150, the secure frequency hopping sequence is sent to one or more PNH-networked devices. The PNH-networked devices each include a PNH networked-device microcontroller having long range spread spectrum frequency hopping (SSFH) firmware. At block 1160, the long range SSFH firmware is updated with the secure frequency hopping sequence. At block 1170, a user is notified that the compromised frequency hopping sequence is compromised. At block 1180, override instructions are received from an authorized user that reactivate the PD. At block 1190, the PD is reactivated.

In one example implementation of method 1100, a PNH receives a notification that an access pad is tampered-with, for example, by a teenager coming home after curfew whose door code does not work after curfew). The PNH deactivates the frequency hopping sequences associated with the access pad, and the access pad is deactivated so that it cannot be used to access the garage. The PNH then selects a secure frequency hopping sequence and sends that secure sequence to other networked devices. In some embodiments, the PNH notifies the other devices of the unsecure or compromised frequency hopping sequence. The devices update their firmware with the frequency hopping sequence information transmitted by the PNH. Finally, the PNH notifies a user, such as a home owner/worried parent, that the access pad is compromised and deactivated. The home owner/worried parent receives the notification on, for example, a mobile device, and sends an override instruction that reactivates the access pad. In some embodiments, the home owner/worried parent actuates the door automatically from the mobile device, thereby letting the teenager know she has been caught.

Figure 12:
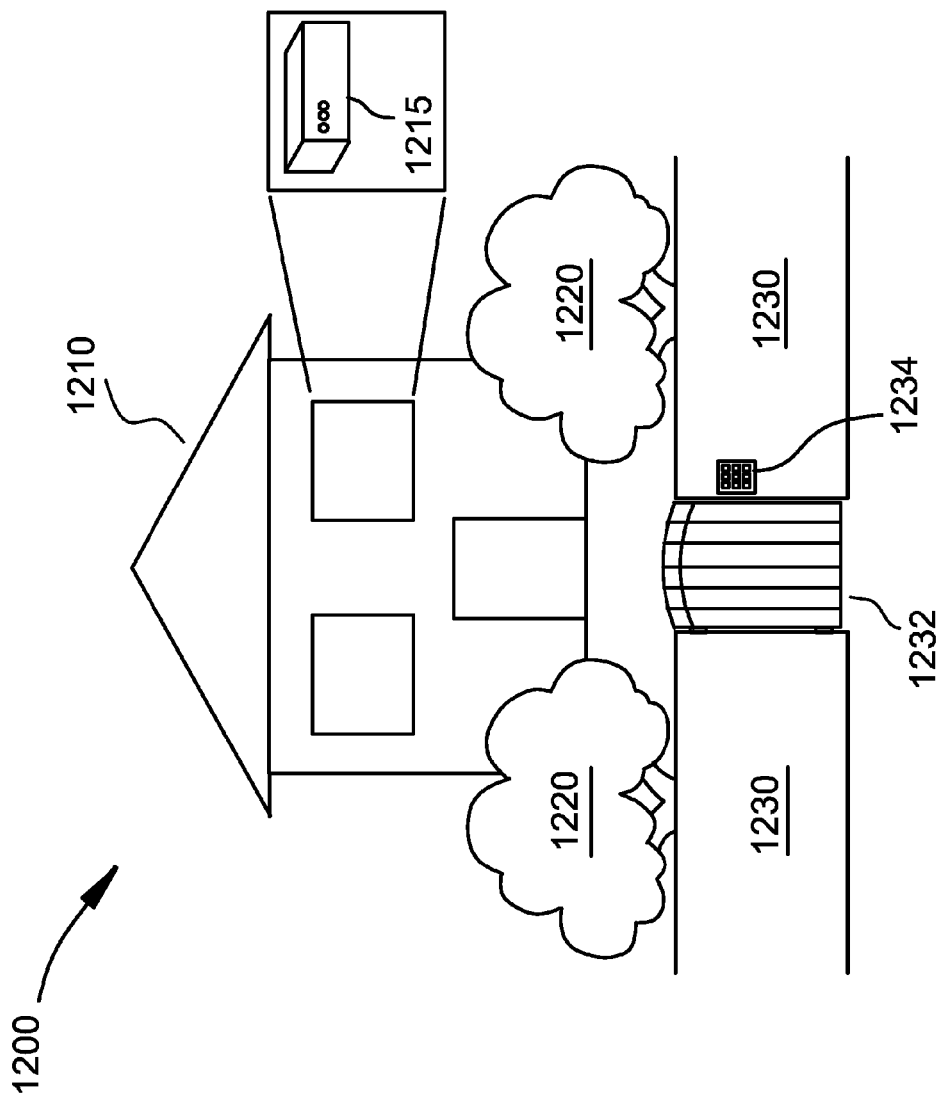
FIG. 12 depicts a specific embodiment of a tamper-resistant or tamper-proof dual modulation network as a network for a residential home.

FIG. 12 depicts a specific embodiment of a tamper-resistant or tamper-proof dual modulation network as a network for a residential home. Residential home 1200 includes house 1210, which houses PNH 1215. Residential home 1100 is surrounded by perimeter fence 1230. Perimeter fence 1230 includes a PD which controls access to residential home 1210. In the present embodiment, the PD is an entry gate 1232, and the PD actuation mechanism includes an access pad 1234. Access pad 1234 includes a transceiver, microcontroller, and tamper circuit as described for other PDs above. Between PNH 1215 and access pad 1234 are obstructions 1220. Obstructions 1220 include, in some embodiments, any structure that impedes and/or interferes with RF signal transmission, such as walls and/or buildings. In some embodiments, obstructions 1220 include landscape features, such as trees, bushes, hills, rocks, etc., that impede and/or interfere with RF signal transmission. Obstructions 1220 also include, in some embodiments, other RF signals that interfere with RF signal transmission.

A tamper-resistant or tamper-proof dual modulation network is useful for centralizing control of many devices located remotely around a residential home while ensuring that compromised PDs do not compromise the security of the entire network. In the depicted example, PNH 1215 stores system operation information for all locally networked PDs around residential home 1200, such as access pad 1234. PNH 1215 communicates directly with such PDs, and receives and transmits security threat information from the PDs.

One example of system operation information is access permission to residential home 1200. PNH 1215 receives and stores pin numbers associated with authorized users of gate 1232. In one embodiment, a user inputs a pin into access pad 1234. Access pad 1234 transmits to PNH 1215 via, for example, a long range SS signal, the access pin entered by the user and a gate 1232 identifier. PNH 1215 receives the pin and gate 1232 identifier and compares those to the stored pin numbers associated with authorized users of gate 1232. If the entered pin and gate 1232 identifier match a pin associated with a user of gate 1232, PNH 1215 transmits a signal to access pad 1234 to unlock gate 1232. If the entered pin and gate 1232 identifier do not match a pin associated with a user of gate 1132, no response is sent, or a signal notifying the user access is denied is sent to access pad 1234.

Another example includes PNH 1215 receiving and storing pin numbers associated with authorized users of gate 1232, and transmitting that data to access pad 1234. Access pad 1234 receives and stores the pin numbers associated with authorized users of gate 1232. A user enters a pin into access pad 1234, and access pad 1234 compares the entered pin to the stored pin numbers associated with authorized users of gate 1232. If the pin matches an authorized pin, access pad 1234 unlocks gate 1132. Otherwise, no signal is sent, and in some embodiments, access pad 1234 notifies the user that access is denied.

In a case where an attacker maliciously seeks to access and/or compromise the network, such as via access pad 1234, the tamper circuit notifies the transceiver to send a signal, which signal notifies PNH 1215 that the network security is compromised. In some embodiments, access pad 1234 deactivates itself. In other embodiments, such as those where authorization is required from PNH 1215 for every transaction, PNH 1215 deactivates access pad 1234.

The invention claimed is:

1. A method comprising:
  receiving a notification at a primary network hub (PNH) that one of a plurality of frequency hopping sequences is compromised, wherein the notification is transmitted by a peripheral device (PD) having a tamper circuit, wherein the tamper circuit notifies the PD that the compromised frequency hopping sequence is compromised;
  deactivating the compromised frequency hopping sequence, wherein a PNH microcontroller comprises deactivation firmware that removes the compromised frequency hopping sequence from the plurality of frequency hopping sequences;
  deactivating the PD;
  selecting a secure frequency hopping sequence from the plurality of frequency hopping sequences;
  sending the secure frequency hopping sequence to one or more PNH-networked devices, wherein the PNH-networked devices each comprise a PNH networked-device microcontroller having long range spread spectrum frequency hopping (SSFH) firmware; and
  upon updating the long range SSFH firmware with the secure frequency hopping sequence the PNH microcontroller sends an all clear signal to the PNH-networked devices, after which the PNH microcontroller and PNH-networked devices resumes normal operation.

2. The method of claim 1, further comprising notifying a user that the compromised frequency hopping sequence is compromised.

3. The method of claim 1, further comprising receiving, from a user, override instructions that interrupts the deactivating the PD.

4. The method of claim 3, further comprising interrupting the deactivating the PD.

5. The method of claim 1, further comprising receiving, from a user, override instructions that reactivate the PD.

6. The method of claim 5, further comprising reactivating the PD.

* * * * *